March 3, 1942.　　　B. L. HENRY　　　2,274,694
EYE STRUCTURE FOR DOLLS
Filed Aug. 8, 1940　　　4 Sheets-Sheet 1

INVENTOR.
BEULAH LOUISE HENRY
BY Clark & Ott
ATTORNEYS

March 3, 1942.  B. L. HENRY  2,274,694
EYE STRUCTURE FOR DOLLS
Filed Aug. 8, 1940  4 Sheets-Sheet 2

INVENTOR.
BEULAH LOUISE HENRY
BY
Clark P Ott
ATTORNEYS

March 3, 1942. B. L. HENRY 2,274,694
EYE STRUCTURE FOR DOLLS
Filed Aug. 8, 1940 4 Sheets-Sheet 3

INVENTOR.
BEULAH LOUISE HENRY
BY
Clark & Ott
ATTORNEYS

March 3, 1942.   B. L. HENRY   2,274,694
EYE STRUCTURE FOR DOLLS
Filed Aug. 8, 1940   4 Sheets-Sheet 4

INVENTOR.
BEULAH LOUISE HENRY
BY
Clark & Ott
ATTORNEYS

Patented Mar. 3, 1942

2,274,694

UNITED STATES PATENT OFFICE 2,274,694

EYE STRUCTURE FOR DOLLS

Beulah Louise Henry, New York, N. Y.

Application August 8, 1940, Serial No. 351,877

6 Claims. (Cl. 46—168)

This invention has relation to eye structures for dolls and has for its principal aim the provision of a doll's eye structure wherein the eye members are more life-like both in their appearance and the movement imparted thereto.

The invention broadly comprehends a doll's eye structure in which eyelids having lashes are provided as elements separate from the eye members and movable either independently of or in conjunction with the eye members so as to more closely simulate the life-like movements of the human eyes and eyelids and to obtain in addition to the lateral rolling of the eye members, a partial closing of the lids thereover and with reference to the iris thereby simulating a "sleepy" or "dreamy" effect which usually precedes the full closing of the lids over the eyes, as well as many other varying expressions attainable by the combined lateral movements of the eye members and vertical movements of the eyelids.

More particularly the invention resides in a doll's eye structure of the character set forth, a pendulum mounted for compound fore and aft and lateral movements, together with means connected with the eye members and eyelids and cooperating with the pendulum for effecting the independent or combined movements of the eye members and eyelids to obtain the aforesaid effects.

The invention is further directed to an improved eye member for dolls wherein the iris of the human eye is photographically reproduced and magnified by a lens effect of the material of which the eyeball is constructed.

The invention also includes as a further feature thereof a set of lower lashes for each eye which is carried by the same mounting which supports the eye structure to provide a unitary assembly so as to facilitate and simplify the emplacement of the same in the doll's head in juxtaposition to the eye openings.

With the above enumerated and other objects in view, the invention is set forth in greater detail in the following specification and illustrated in the accompanying drawings, in which Fig. 1 is a fragmentary vertical sectional view through a doll's head taken approximately on the line 1—1 of Fig. 2 and illustrating the head in an upright position with the eyelids open and the eye members disposed in a straight forward position.

Figure 1:
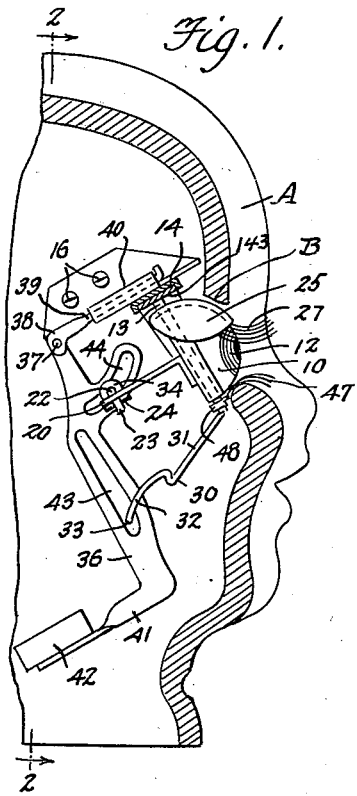

Referring to the drawings by characters of reference and particularly to the form of the invention illustrated in Figs. 1 to 5 inclusive, A designates a doll's head which is of hollow construction and is provided with the usual eye holes B. The eye structure constituting the present invention includes a pair of substantially semispherical eye members 10 and 11, each having an iris 12 medially of the forward portion and slightly below the vertical center thereof. The eye members 10 and 11 are respectively supported for lateral turning movement on upright rearwardly inclined pintles 13 which are carried by and depend from a superposed bar 14 in laterally spaced relation commensurate with the spacing of the eye holes B in the doll's head.

The supporting bar 14 is suitably attached in a transverse horizontal position within the doll's head A and as herein illustrated, the means of attachment consists of an angle member 15 at the opposite ends of the supporting bar which angle members are anchored by screws or other fastening elements 16 to the head structure. The eye members are each provided with a rearwardly directed lever arm 20 having a vertical aperture 21 adjacent its free rear terminal and a transverse connecting rod 22 is provided having downturned ends 23 engaging the apertures 21 and secured in place by a cotter pin 24 or equivalent means for retaining the connecting rod in assembled relation with the lever arms so that the eye members 10 and 11 are connected for simultaneous lateral swinging movement, while the eye members are fixed against vertical swinging movement and limited only to said lateral swinging movement.

The eye structure further includes a pair of concavo-convex eyelids 25 and 26 which follow generally the spheroidal contour of the eye members 10 and 11 but are of slightly greater radius to nest over the eye members and freely move with reference thereto. The eyelids 25 and 26 are each provided with lashes 27 along their lower forward edges.

The eyelids 25 and 26 are fixedly connected by a rockable connecting shaft 28 which is mounted for rocking movement in a pair of spaced bearing lugs 29 depending from the underside of the supporting bar 14 and extending on a transverse horizontal axis coinciding with the horizontal axes of the eye members 10 and 11 to permit of movement of the eyelids upwardly and downwardly to covering and uncovering relation to the position of the eye members exposed through the eye holes B. The rock shaft 28 has connected thereto, depending therefrom and extending rearwardly with reference thereto, a yoke 30 having laterally spaced arms 31 and a loop portion 32 which defines a transverse horizontal lead 33.

Intermediate its ends, the connecting bar 22 is provided with a pair of closely spaced shoulders 34 which, as illustrated, are in the form of sleeves having confronting rounded inner ends. The means for imparting motion to the eye members 10 and 11 and the eyelids 25 and 26 consists of a pendulum 36 which is suspended for combined fore and aft and lateral movements and which as here illustrated, consists of a flat sheet metal arm which is pivoted at its upper end on a transverse horizontal pin 37 extending through the bifurcated rear terminal 38 of a rotatory pintle 39 which is rockably mounted in a tubular bearing 40 secured to and extending fore and aft of the supporting bar 14. The pendulum arm 36 has secured to the lower angularly disposed terminal 41 a weight 42 and said pendulum arm is formed with an upright slot 43 through which the transverse horizontal lead 33 of the bail extends. The pendulum arm is also provided with an arcuate slot 44 struck from a radius employing the horizontal pin 37 as a center and the connecting rod 22 extends therethrough with the shoulders 34 disposed on opposite sides of the pendulum arm adjacent the slotted portion 44.

Figure 2:
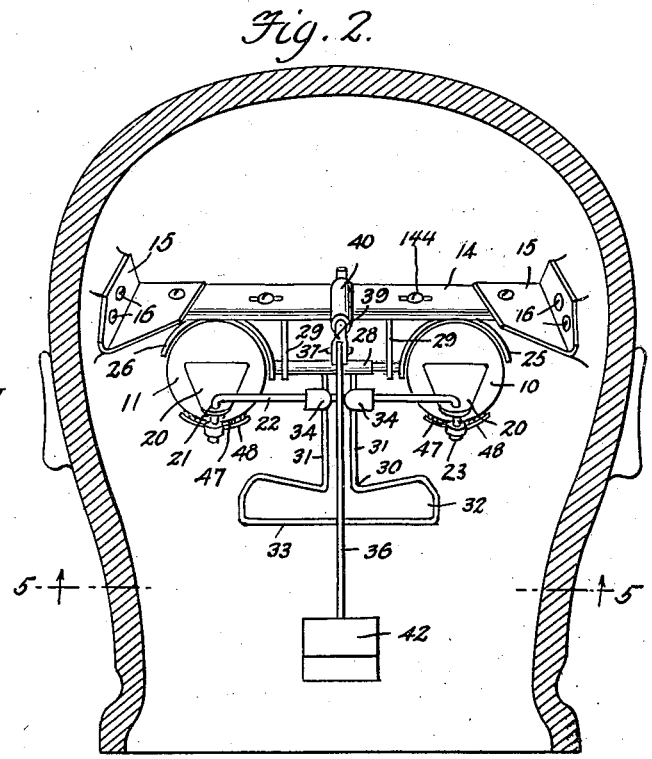
Fig. 2 is a vertical sectional view through the doll's head in the position shown in Fig. 1 and taken approximately on the line indicated at 2—2 of Fig. 1.
Figure 3:
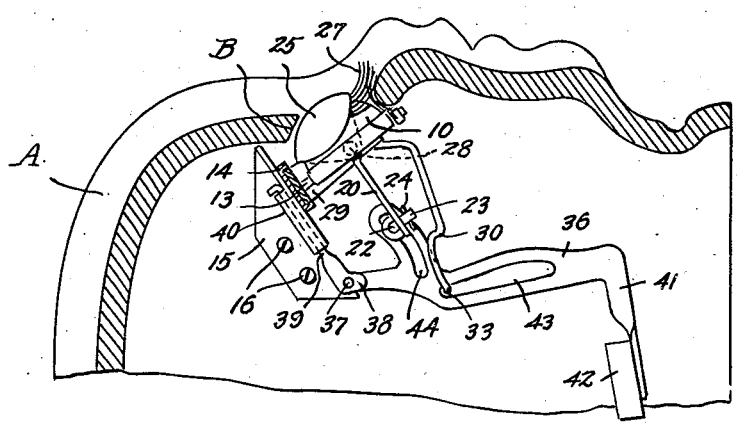
Fig. 3 is a view similar to Fig. 1 illustrating the doll's head in a reclining position with the eyelids swung with reference to the eye members to cover the same.

In use and operation it will be observed that when the doll head is in upright position, as shown in Figs. 1 and 2, the pendulum 36 is so positioned with reference to the connecting rod 22 and yoke lead 33 as to dispose the irises 12 of the eye members 10 and 11 centrally of the eye openings B, while the yoke lead 33 engaged by the slotted portion 43 of the pendulum disposes the eyelids 25 and 26 in an upwardly swung position to uncover the irises of the eye members. If the doll's head is moved directly rearward to a reclining position, as shown in Fig. 3 of the drawings, the slotted portion 43 of the pendulum 36 engaging with the transverse horizontal lead 33 of the yoke 30 effects a rearward and upward swinging movement of the yoke thus rocking the rock shaft 28 in a direction to swing the eyelids 25 and 26 downwardly to covering relation with the eye members 10 and 11 and simulating the closing of the eyes and sleeping of the doll. It should be noted that this operation does not affect any downward moving or lateral turning of the eye members as the eyelids merely move downwardly with reference to the eye members to cover the irises 12, the connecting rod 22 being freely movable in the arcuate slot 44.

Figure 4:
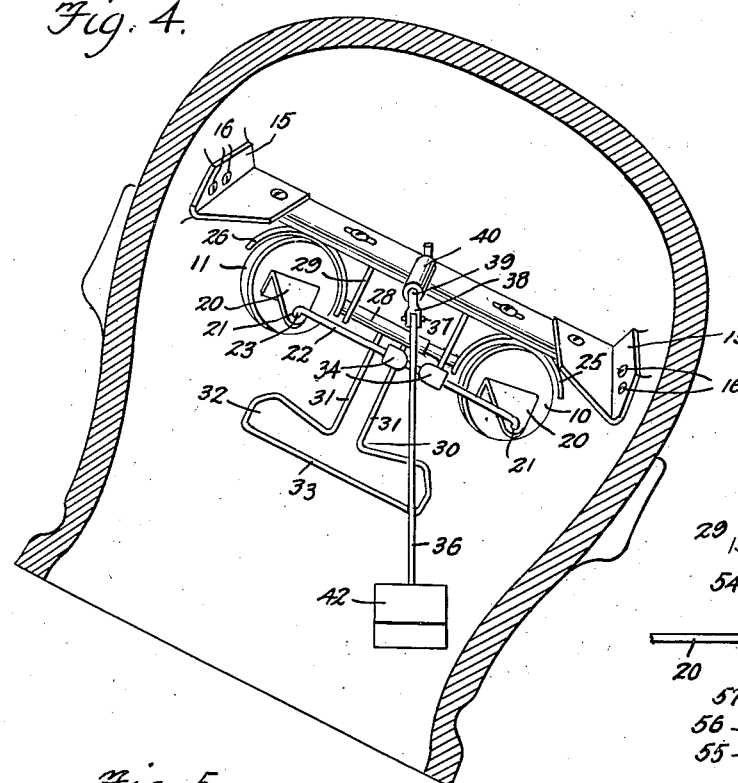
Fig. 4 is a view similar to Fig. 2 illustrating the doll's head canted laterally with the eye members swung to a lateral position to simulate the rolling of the eyes.

The lateral movement or rolling of the eyes may be accomplished without movement of the eyelids by holding the doll's head in an upright position and canting the same laterally as shown in Fig. 4, in which instance the pendulum 36 engaging one of the shoulders 34 effects a relative axial movement of the connecting rod 22 which by relative shifting movement of the lever arms 20 causes the eye members 10 and 11 to swing laterally on the depending pintles 13. During this movement, the slotted portion 43 of the pendulum 36 moves freely and longitudinally relative to the transverse horizontal lead 33.

It is also possible, by the construction set forth, to effect a combined up and down movement of the eyelids 25 and 26 and a lateral rolling of the eye members 10 and 11 by inclining the doll's head rearwardly and at the same time canting the head laterally to produce varying effects and expressions from the partial closing of the lids and the lateral rolling of the eyes as the pendulum serves as a common gravitational actuating means for effecting said movements.

The invention embodies as a further feature, lower eyelashes 47 which are secured to an arcuate strip 48 in turn anchored to the lower ends of the depending pintles 13 to provide a unitary structure or assembly which facilitates, simplifies and economizes in the positioning of the lower eyelashes coincident with the mounting of the eye structure in the doll's head.

Figure 6:
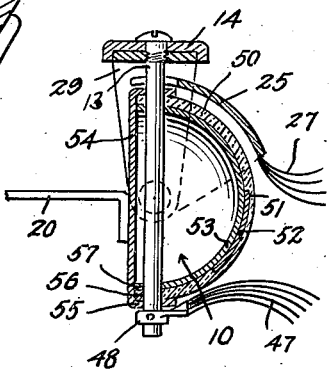
Fig. 6 is an enlarged sectional view through an eye member illustrating the construction thereof.
Figure 5:
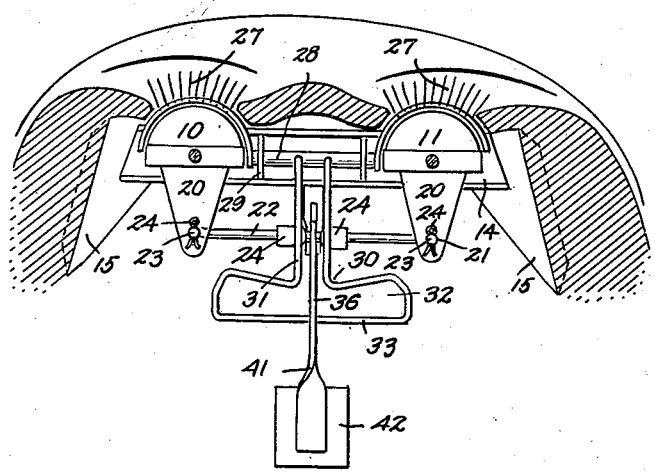
Fig. 5 is a horizontal sectional view taken approximately on the line 5—5 of Fig. 2.

The eye members 10 and 11 each preferably consists of a hollow semi-spherical body 50 as illustrated in Fig. 6 of the drawings, which may be of any suitable light-weight material and which, in this instance, is transparent and formed centrally of its concave rear surface with a depression or recess 51. A disk 52 bearing a photographic reproduction of a human iris is positioned within the depression or recess 51 so as to be exposed through the transparent outer wall of the body at the recessed portion and a coating 53 of white opaque paint is applied to the inner surface of the body 50 preferably by spraying. This produces a white eyeball member with the colored photographically produced iris 12. The rear open portion of the body 50 has applied thereto a cap or base 54 having an annular flange 55 fitted over the body in surrounding relation thereto and secured in place in any desired manner. The central rear portion of the cap or base has secured thereto the rearwardly projecting lever arm 20. The flange and rear portion of the body 50 are then formed with aligned diametrically disposed apertures 56 and 57 which receive therethrough the mounting pintle 13.

Figure 7:
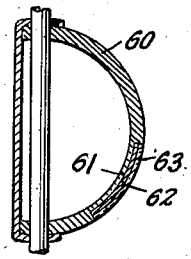
Fig. 7 is a similar sectional view illustrating a modified form of eye member construction.
Figure 8:
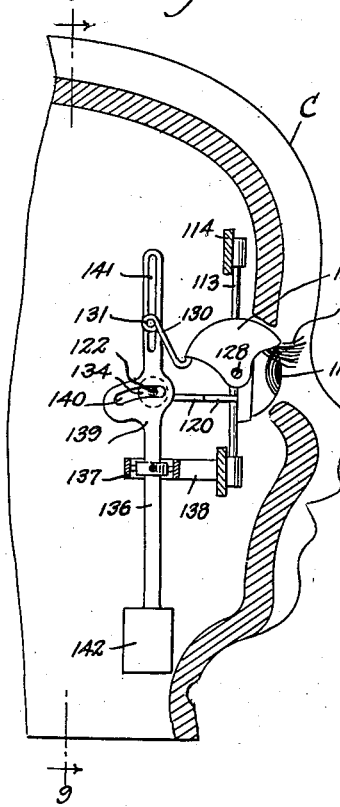
Fig. 8 is a fragmentary vertical sectional view through a doll's head taken approximately on the line 8—8 of Fig. 9 and illustrating a modified form of eye structure.
Figure 9:
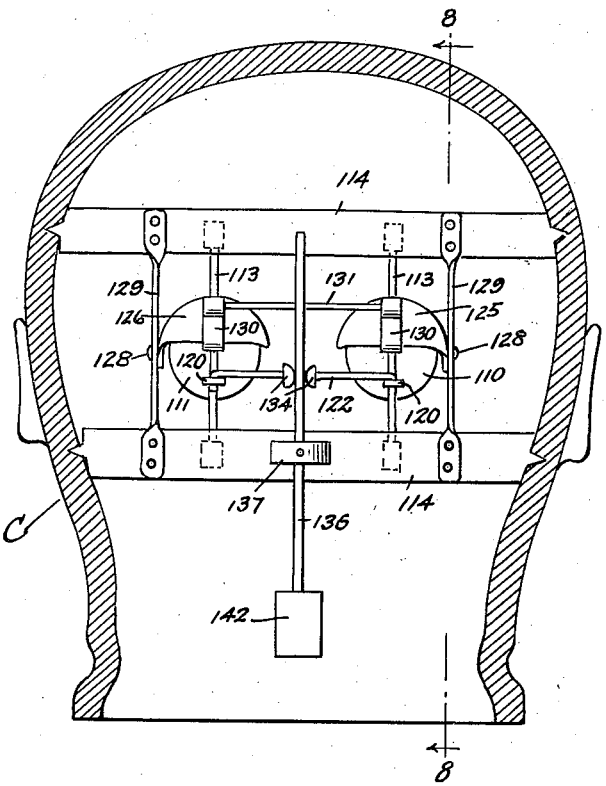
Fig. 9 is a vertical sectional view taken approximately on the line 9—9 of Fig. 8.
Figure 10:
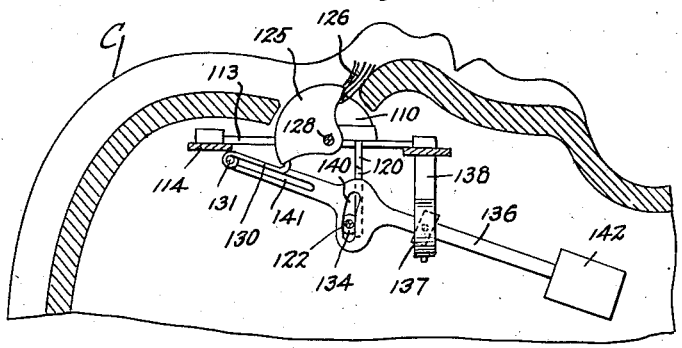
Fig. 10 is a view similar to Fig. 6 illustrating the doll's head in a reclining position with the eyelids swung with reference to the eye members to cover the same.
Figure 11:
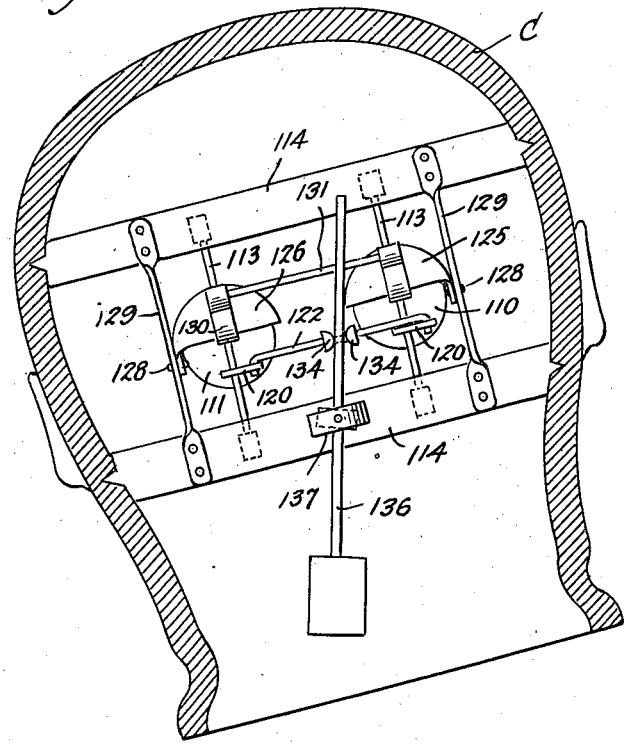
Fig. 11 is a view similar to Fig. 9 illustrating the doll's head canted laterally with the eye members swung to a lateral position.
Figure 12:
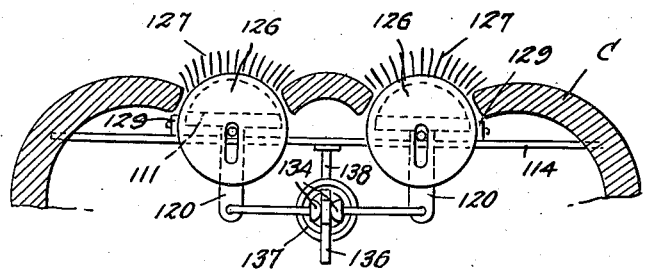
Fig. 12 is a horizontal sectional view taken on the line 12—12 of Fig. 9.

In the modification of eye member construction illustrated in Fig. 7, the hollow semi-spherical body 60 is of a white opaque light-weight material and in this instance, the same is formed substantially centrally of its convex forward surface with a depression 61 within which is fitted a disk 62 bearing a photographic reproduction of a human iris. A transparent plug 63 is fitted within the recess to cover the disk 62 and is suitably secured in place adhesively or otherwise.

In the form of the invention illustrated in Figs. 8 to 12 inclusive, the eye members 110 and 111 are substantially identical with those shown in the previous form of the invention and include the irises 112. The eye members 110 and 111 are respectively supported for lateral turning movement on upright pintles 113 which are secured to upper and lower transversely disposed horizontal supporting bars 114 suitably anchored within the doll's head C. The eye members are each provided with a rearwardly directed lever arm 120 pivotally connected respectively to the opposite ends of a connecting rod 122 for simultaneous lateral swinging movement while the eye members are fixed against vertical swinging movement and are thus limited only to lateral swinging thereof.

The eye structure in this form of the invention includes a pair of concavo-convex eyelids 125 and 126 provided with lashes 127 protruding from the same along the forward edges thereof. In this instance, the outermost sides of the eyelids 125 and 126 are pivotally connected as at 128 to vertical frame bars 129 which are anchored at their upper and lower ends to the horizontal transverse frame bars 114. Each of the eyelids is formed with a rearwardly and upwardly directed tail piece 130 which is joined together by a transverse horizontal connecting rod 131. The connecting rod 122 is provided with closely spaced shoulders 134.

In this form of the invention the means for imparting motion to the eye members 110 and 111 and the eyelids 125 and 126 consists of a pendulum 136 which is supported for fore and aft and lateral swinging movement by means of a gimbal ring 137 carried by a bracket 138 protruding rearwardly from the lower frame bar 114. The upper end or portion 139 of the pendulum 136 which protrudes above the gimbal ring is formed with an arcuate slot 140 struck from a radius employing as a center the axis of the gimbal ring which permits the fore and aft movement and through which slot the connecting rod 122 extends. The upper portion 139 of the pendulum is also provided with a vertical slot 141 through which the connecting rod 131 extends. The lower end of the pendulum 136 is provided with a weight 142 and the operation of the eye structure in this instance is identical with that described in connection with the form of the invention illustrated in Figs. 1 to 5 of the drawings.

In order to render the eye members and the eyelids laterally adjustable to accommodate lateral variations in the spacing of the eye openings of the doll, the shaft 28 connecting the eyelids may be formed of telescopically associated parts as illustrated in Figs. 2 and 4 of the drawings, and the supporting bar 14 may include strap members 143 slidable with reference to the bar 14 and adapted to be secured in adjusted relation by the set screws 144.

The eye members 10 and 11 may consist of a transparent semi-spherical body 50 as illustrated in Fig. 6, but instead of the same being provided with the disk 55 bearing a photographic reproduction of a human eye, the inner surface thereof has secured thereto a photographic reproduction of the forward portion of a human eye including the iris and white eyeball.

What is claimed is:

1. In an eye structure for dolls, a pair of eye members each having a substantially semi-spherical forward portion, a superposed supporting bar having a pair of depending pintles on which the eye members are mounted for lateral turning movement and fixed against vertical swinging movement, a rearwardly directed arm on each eye member, a transverse connecting rod having pivotal connection at its opposite ends with said arms and formed with spaced shoulders intermediate its ends, an eyelid for each eye member, a shaft rockably carried by the supporting bar and connected to said eyelids to permit of vertical arcuate movement of the eyelids in unison to cover and uncover the forward portions of the eye members, a yoke secured to said shaft and depending downwardly therefrom and having a rearwardly extending loop portion formed with a transversely extending rear lead, a pintle rockably carried by the supporting bar, a pendulum having a pendulum arm pivoted at its upper end to the pintle to permit of fore and aft swinging movement thereof and lateral swinging movement thereof with the rocking of the pintle on the supporting bar, said pendulum arm being provided with an upper slotted portion through which extends the transverse eye member connecting rod with the said shoulders disposed on opposite sides thereof, and said pendulum arm having a lower slotted portion through which extends the transverse lead of the yoke for turning of the eyelids by the engagement of said transverse lead of the yoke in the said lower slotted portion with the fore and aft swinging of the pendulum and for turning the eye members by the engagement of the upper slotted portion with the shoulders of the connecting rod by the lateral swinging of the pendulum.

2. In an eye structure for dolls, a pair of eye members each having a substantially semi-spherical forward portion, a superposed supporting bar having a pair of depending pintles on which the eye members are mounted for lateral turning movement and fixed against vertical swinging movement, a rearwardly directed arm on each eye member, a transverse connecting rod having pivotal connection at its opposite ends with said arms and formed with spaced shoulders intermediate its ends, an eyelid for each eye member, a shaft rockably carried by the supporting bar and connected to said eyelids to permit of vertical arcuate movement of the eyelids in unison to cover and uncover the forward portions of the eye members, a yoke secured to said shaft having a rearwardly disposed transverse lead, a pintle rockably carried by the supporting bar, a pendulum pivoted to said pintle for fore and aft swinging movement thereof and for lateral swinging movement thereof with the rocking of the pintle, said pendulum having slotted portions respectively receiving therethrough the transverse eye member connecting rod between the shoulders thereof and the transverse lead of the yoke for turning the eyelids by the fore and aft swinging movement of the pendulum and for turning the eye members by the lateral swinging movement thereof.

3. In an eye structure for dolls, a pair of eye members each having a semi-spherical forward portion, a supporting bar, a pair of pintles pivotally supporting the eye members to the supporting bar for lateral turning movement thereof, a rearwardly directed arm on each eye member, a transversely extending connecting rod pivoted at its ends to the arms of the eye members and having spaced shoulders intermediate its length, an eyelid for each eye member, a shaft disposed between and connected to said eyelids, means rockably connecting said shaft to the supporting bar to permit of the arcuate movement of the eyelids to cover and uncover the forward portions of the eye members, a pendulum having an arm pivotally and rockably carried by said supporting bar for fore and aft and lateral swinging movements, said arm having an arcuate slot through which extends the rod connecting the eye members with the shoulders thereof disposed on opposite sides of said slot for turning of the eye members by engagement of the arm with said shoulders with the lateral swinging of the pendulum, and said arm having an elongated inclined slot, means carried by said shaft having a transverse lead extending through said elongated slot for turning the eyelids by camming said transverse lead upwardly with the fore and aft swinging of the pendulum.

4. In an eye structure for dolls, a pair of eye members each having a substantially semi-spherical forward portion, a superposed supporting bar having a pair of depending pintles upon which the eye members are mounted for lateral turning movement and fixed against vertical swinging movement, a rearwardly directed arm on each eye member, a transverse connecting rod having pivotal connection at its opposite ends with said arms and formed with spaced shoulders intermediate its ends, an eyelid for each eye member, a shaft rockably carried by the supporting bar and connected to said eyelids to permit of vertical arcuate movement of the eyelids in unison to cover and uncover the forward portions of the eye members, a yoke secured to said shaft having a rearwardly disposed transverse lead, a pendulum carried by the supporting bar for lateral and fore and aft swinging movements and having slotted portions respectively receiving therethrough the transverse eye member connecting rod and the transverse lead of the yoke with said slotted portions being so arranged as to permit of independent actuation of the eye members and eyelids and the joint actuation thereof by swinging movement of the pendulum.

5. In an eye structure for dolls, a pair of eye members, means for mounting said members to permit of and limit the same to lateral turning movement on upright axes, an eyelid for each eye member, means connected to said eyelids for mounting the same for arcuate vertical swinging movement on a horizontal transverse axis to cover and uncover the forward portions of the eye members, means of connection between the eye members for simultaneous lateral turning movement thereof, an eyelid moving element and a pendulum including a weight, an upwardly directed arm, and a universal pivoting means for mounting said pendulum arm for fore and aft and lateral swinging movements, said pendulum arm respectively engaging said eye member connection and said eyelid moving element for turning the eye members by the lateral swinging movement of the pendulum and for turning the eyelids by the fore and aft movement thereof.

6. In an eye structure for dolls, a pair of eye members, means mounting said eye members for simultaneous lateral turning movement on upright axes, an eyelid for each eye member, means mounting said eyelids for simultaneous arcuate vertical swinging movement on a horizontal transverse axis, a pendulum and a universal pivoting means therefor located rearwardly of the mountings for the eye members and eyelids and supporting said pendulum for lateral and fore and aft swinging movements, and means of connection between the pendulum and said eye members and eyelids respectively for moving the same upon lateral and fore and aft swinging movements of the pendulum.

BEULAH LOUISE HENRY.